United States Patent Office 3,011,897
Patented Dec. 5, 1961

3,011,897
SWEETENING COMPOSITION AND METHOD OF PRODUCING THE SAME
William M. Grosvenor, Jr., Pelham, N.Y., assignor to The American Sugar Refining Company, New York, N.Y., a corporation of New Jersey
No Drawing. Filed Oct. 21, 1959, Ser. No. 847,687
2 Claims. (Cl. 99—141)

This invention relates to a low calory sweetening composition in pulverulent form, dispensible by volume in much the same manner as granular sugar (e.g., by the cup, tablespoon, or teaspoon), and which is particularly adapted for household use.

The new low calory sweetening composition is a porous, spongelike material made up of fine particles of sugar and of synthetic sweetener agglomerated into granules comparable, e.g., to the size of granulated sugar, but having a bulk density of e.g. around one-half that of granulated sugar.

Present non-caloric sweeteners, such as saccharine and cyclamates, are put up as solutions or as pills, and dispensed and used as drops or multiple drops of the solutions or as one or more individual pills. Without special effort, it is impossible to split the dosage to a part of a pill or a fraction of a drop. Sweetening of fruits, cereals and the like is difficult with such solutions, and almost impossible with pills. There are also certain psychological factors which limit the use of such non-caloric sweeteners. When used in cooking, the straight synthetic sweeteners provide no browning reaction.

The improved low calory compositions of the present invention overcome, to a large extent, the objections to the use of the non-caloric sweeteners by themselves and provide a new sweetening composition which can be used like sugar and which has a sweetness comparable to that of sugar, but which has only a fraction of the calories of a comparable volume of granular sugar.

The new composition is made by combining fine pulverized sugar together with fine synthetic sweetener, in proper proportions, into porous, spongelike agglomerates or granules of low bulk density, and with the agglomerates or granules of a size such that they can be used in much the same manner that granular sugar is used as a sweetener, and with a similar sweetening action.

The finely divided sugar which is used in making the new composition may be ordinary powdered sugar such as 6X or 10X powdered sugar. Such powdered sugar is made by grinding granular sugar to the desired fineness. The synthetic sweetener can be separately pulverized or ground to the desired size if it is not already in a sufficiently finely divided state. Or the synthetic sweetener can be admixed with the granular sugar before grinding and the admixture ground together. Alternatively and advantageously, the synthetic sweetener can be admixed with a small part of the granular sugar as a preliminary step of the process, and the resulting preliminary mixture then mixed with the larger amount of granular sugar.

The synthetic sweeteners which are used in making the new compositions are water-soluble synthetic sweeteners such as soluble saccharine, calcium cyclamate or sodium cyclamate, or mixtures of two or more such sweeteners. Where the saccharine is in the form of a coarse powder, it is separately ground before admixture with the pulverized sugar or is admixed with the granular sugar and ground at the same time.

The sugar which is particularly advantageous in the new compositions is ordinary household sugar or sucrose, but other sugars or mixtures of sugars can be used, including dextrose, etc.

The proportions of sugar and synthetic sweetener will in general be such that the resulting granular porous spongelike product will have a sweetness similar to or comparable with that of a similar volume of granular sugar. With a bulk density of the porous spongelike product equal to about one-half that of granular sugar, the amount of sugar by weight in the porous granular product will be approximately one-half that of the granular sugar, and the amount of synthetic sweetener will be sufficient to impart an over-all sweetness comparable with that of granular sugar. With a bulk density of one-third that of granular sugar the amount of synthetic sweetener will supply about two-thirds of the sweetness; with a bulk density of about 60% that of granular sugar the amount of synthetic sweetener will supply about 40% of the sweetness.

The conversion of the finely divided sugar and synthetic sweetener into the form of an agglomerated product is accomplished by moistening the surfaces of the particles and agitating the particles to cause agglomeration of the fine, moistened particles to form agglomerates of a spongelike character and low bulk density, and by drying the agglomerates, and with screening, if necessary, to separate oversize granules and fines. Methods suitable for accomplishing such formation of agglomerate products of low bulk density are described in U.S. Patents Nos. 2,893,871 and 2,900,256, and French Patent No. 1,136,468.

The invention will be further described in connection with the following specific examples, illustrating different compositions, but it will be understood that the invention is not limited thereto.

The examples illustrate the use of different sugars, and different synthetic sweeteners, in which the amount of synthetic sweetener is approximately equal, in sweetening power, to the amount of sugar with which it is used, so that, with the production of a porous, spongelike granular product having half the bulk density of granular sugar, the composition will have a sweetness comparable with that of an equal volume of granular sugar. As the bulk density of the product is varied to a somewhat higher or lower bulk density, the sweetening power of the composition can be similarly varied to one which is somewhat greater than or somewhat less than that of a corresponding volume of granular sugar.

For purposes of determining the approximate amounts of synthetic sweetener and sugar to be used, if the sweetening power of sugar is taken as 1, that of anhydrous dextrose is around 0.66; that of saccharine, around 300; that of sodium or calcium cyclamate, around 30; and where a 9:1 ratio of saccharine to cyclamates is used, around 57.

The following examples are on the basis of approximately 20 pounds of sugar with an amount of synthetic sweetener approximately equal in sweetening power to that of the sugar. In each case, the mixture of sugar and synthetic sweetener is ground, in a suitable mill such as a micropulverizer or Bauermeister U–Z–U–00 mill, to a fineness corresponding to around 10X sugar.

*Example 1.*—A mixture was made of 20 pounds of fine, granular sugar and 30 grams of sodium saccharine, the mixture was ground, and the finely powdered mixture subjected to agglomeration, and drying of the agglomerates, to form a porous spongelike granular product of low bulk density, approximating one-half that of the granular sugar.

*Example 2.*—A similar mixture was prepared and used in which 20 pounds of fine, granular sugar were combined with 300 grams of sodium cyclamate.

*Example 3.*—A similar mixture was made in which the initial mixture was 20 pounds of fine, granulated sugar and 300 grams of calcium cyclamate.

*Example 4.*—A mixture of sodium cyclamate and sodium saccharine was used. With 20 pounds of fine, granulated sugar, 143.1 grams of sodium cyclamate and 15.9 grams of sodium saccharine, or a total of 159 grams of the mixture, were used, these amounts having a sweetness equivalent to or similar to that of the 20 pounds of granular sugar used.

*Example 5.*—A similar mixture was made to that of Example 4, except that calcium cyclamate was used instead of sodium cyclamate and in the same amount.

*Example 6.*—20 pounds of anhydrous dextrose was used with 45.5 grams of saccharine sodium, this being the approximate amount to increase the sweetness of the resulting porous granules to a sweetness comparable with a corresponding amount of granular sucrose. The mixture was ground and agglomerated in the manner above described.

*Example 7.*—20 pounds of dextrose were used in a similar way with 455 grams of sodium cyclamate.

*Example 8.*—This example differs from Example 7 in that 455 grams of calcium cyclamate were used to 20 pounds of dextrose.

The above examples illustrate the use of an amount of synthetic sweetener which will give to the resulting granular spongelike product of a bulk density about half that of granular sugar a sweetness comparable to that of a corresponding volume of granular sugar. When sucrose is used with a synthetic sweetener in such amounts, the resulting porous granular product, with the bulk density approximately half that of granular sugar, will have a sweetness approximating that of a similar volume of granular sugar. Products of somewhat increased or decreased bulk density can be made, with a corresponding adjustment of the proportion of sugar and synthetic sweetener, to give a product having a sweetness comparable with that of a corresponding volume of granular sugar.

The new sweetening composition overcomes the objections to the use of synthetic sweeteners by themselves. They can be used in much the same manner that granular sugar is used for household use. A teaspoonful of the new composition has a sweetness comparable to that of a teaspoon of ordinary granulated sugar, but only about half the calories. The new compositions have the advantage of rapid disintegration in water or other beverages. They can be used for the sweetening of fruits and cereals and the like to obtain a sweetness comparable to that of a similar volume of granular sugar, but with a corresponding reduction in calories. Their use in cooking gives the browning reaction of sugar, but with a reduced sugar content and reduction in calories.

The new compositions have the advantage that they can be used for household purposes in the same manner that ordinary granular sugar is now used and to obtain a similar or corresponding sweet taste, but with a radical reduction in calory content. They are advantageous for use by those individuals who watch their weight and desire a low caloric intake.

I claim:

1. A low calory sweetening composition in the form of a porous, spongelike, agglomerated product of a low bulk density which is a fraction of the bulk density of granular sugar, the agglomerates of said composition being made up principally of fine particles of sugar and a small amount of fine particles of non-caloric synthetic sweetener agglomerated by moistening, agitation and drying, the proportions of synthetic sweetener being sufficient to give to the composition a sweetness comparable to that of a corresponding volume of granular sugar.

2. The method of producing a low calory, porous, spongelike, agglomerated sweetening composition of low bulk density which is a fraction of the bulk density of granular sugar, which comprises admixing fine particles of sugar and synthetic sweetener, subjecting the mixture to agglomeration by moistening with agitation to agglomerate the mixture to form spongelike agglomerates, and drying the product, the proportions of the fine sugar particles and of the synthetic sweetener being such that the sweetness of the product is comparable to that of a corresponding volume of granular sugar, and the bulk density of the granular product being a fraction of the bulk density of granular sugar.

References Cited in the file of this patent

UNITED STATES PATENTS 2,761,783     Ferguson _____ Sept. 4, 1956